(12) United States Patent
Delaney

(10) Patent No.: US 6,954,810 B2
(45) Date of Patent: Oct. 11, 2005

(54) TRANSPARENT SWITCH

(75) Inventor: William P. Delaney, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 281 days.

(21) Appl. No.: 10/610,619

(22) Filed: Jun. 30, 2003

(65) Prior Publication Data

US 2004/0267991 A1 Dec. 30, 2004

(51) Int. Cl.[7] .................... G06F 13/00; G06F 13/38; H04L 12/28; H04L 12/56
(52) U.S. Cl. .................. 710/107; 710/105; 370/420; 370/911
(58) Field of Search .................. 710/107, 105, 710/305, 313, 316, 317; 370/258, 420, 402, 463, 911, 351, 431; 709/249, 253; 340/2.1, 825; 712/29

(56) References Cited

U.S. PATENT DOCUMENTS

| | | | | |
|---|---|---|---|---|
| 5,555,543 A | * | 9/1996 | Grohoski et al. | 709/209 |
| 5,659,718 A | * | 8/1997 | Osman et al. | 713/400 |
| 5,664,223 A | * | 9/1997 | Bender et al. | 710/22 |
| 6,098,110 A | * | 8/2000 | Witkowski et al. | 709/249 |
| 6,771,612 B1 | * | 8/2004 | Park | 370/276 |
| 6,807,167 B1 | * | 10/2004 | Chakrabarti et al. | 370/352 |

OTHER PUBLICATIONS

"Newmultiprotocol WDM/CDMA-based optical switch architecture" by Benhaddou et al. (abstract only) Publication Date: Apr. 22–26, 2001.*

"New protocol transfer module for USB2.0–to–IEEE 1394 interfaces using synchronous packet control for audio and video data streams" by Fujimori et al. (abstract only) Publication Date: Jun. 18–20, 2002.*

* cited by examiner

*Primary Examiner*—Gopal C. Ray
(74) *Attorney, Agent, or Firm*—Cochran Freund & Young, LLC

(57) ABSTRACT

A transparent switch is able to emulate the arbitration and addressing steps for devices that are normally connected to a bus-type communications network. The switch is connected to the devices in a star-type arrangement, with each device connected to a separate port. The switch performs the arbitration and addressing communications with a transmitting device, selects the proper port as defined by the addressing communication, arbitrates with the receiving device, and then switches the communications to occur directly from the transmitting device to the receiving device.

17 Claims, 4 Drawing Sheets

TRANSPARENT SWITCH CONNECTED TO BUS PROTOCOL DEVICES

TRANSPARENT SWITCH

BACKGROUND OF THE INVENTION a. Field of the Invention

The present invention pertains to communication protocols and specifically to communication protocols that involve arbitration, addressing, and data communication in a master/slave arrangement.

b. Description of the Background

Many simple busses exist for the communication between different devices. Such busses typically have several different devices connected to the bus with some devices acting as a master and some devices acting as slaves. In some systems, a device may sometimes act as a master and sometimes as a slave.

In a typical protocol, an idle state exists in which a master device may assert control of the bus and supply an address of a device with which the master wishes to communicate. The period of time wherein a master asserts and attains control of the bus is an arbitration period that typically has a procedure for arbitrating when to assert control and for arbitrating which master has control when two or more master devices are asserting substantially simultaneously. The addressing period involves initiating communication with a slave device. Once communication is established, data communication will proceed and the bus will enter the idle state.

An example of a useful bus of the type described above is the Inter-Integrated Circuit ("I2C") bus designed by Philips. In a typical I2C deployment, several integrated circuit chips on a printed circuit board may connect to the I2C bus and establish communications between integrated circuits within the printed circuit board. Other such busses may be used for networks linking various devices in a factory automation control system, networks linking several measurement devices, and the like.

The advantages of such busses are that they have simple logic and are relatively easy to implement using state machines or other simple technology. However, several limitations exist. First, as the number of devices attached to the bus increases and the amount of communications increase, the bus may become congested with traffic. Further, when a first device is communicating with a second device, a third device is prevented from communicating with a fourth device because the bus is busy. Thirdly, it is possible that one device may become inoperative and may cause the entire bus to malfunction, preventing any communications traffic to flow.

It would therefore be advantageous to provide a system and method whereby a simple communication bus may handle increased traffic while keeping the same arbitration, addressing, and communications protocol. It would be further advantageous to provide a system and method whereby multiple simultaneous communications paths may be made available on the communications bus.

SUMMARY OF THE INVENTION

The present invention overcomes the disadvantages and limitations of the prior art by providing a system and method for a star-type communications network using a bus-type communications protocol. Each device on the network is connected to a transparent switch that emulates the standard communications protocol for arbitration and addressing with a transmitting device, similarly emulates the arbitration and addressing with one or more destination devices, and connects the transmitting device with the receiving device. The transparent switch may enable several different simultaneous communications to occur.

The present invention may therefore comprise a method of communicating from a first device to a second device wherein the devices are capable of communicating on a bus topology using a bus protocol comprising: providing a transparent switch having at least a first port and a second port being capable of communicating using the bus protocol; connecting the first device to the first port to establish a first connection; connecting the second device to the second port to establish a second connection; communicating a first initial sequence from the first device to the transparent switch, the first initial sequence comprising an address; determining that the address is an address of the second device; communicating a second initial sequence from the transparent switch to the second device, the second initial sequence comprising the address; connecting the first port to the second port; communicating between the first device to the second device over the first port connected to the second port; and disconnecting the first port from the second port.

The present invention may further comprise a transparent switch for communicating on a bus topology using a bus protocol comprising: a first port connectable to a first device, the first port capable of communicating to the first device using the bus protocol; a second port connectable to a second device, the second port adaptable of communicating to the second device using the bus protocol; a controller adapted to receive a first initial sequence on the first port, transmit a second initial sequence on the second port, connect the first port to the second port, determine that an ending sequence has been received on the first port, transmitting the ending sequence on the second port, and disconnecting the first port from the second port.

The advantages of the present invention are that communications between two or more sets of transmitting and receiving devices may occur simultaneously, thereby greatly increasing the amount of communications traffic over the network. Further, devices that fail or have problems may be taken off of the network without compromising the network integrity.

DETAILED DESCRIPTION

Figure 1:
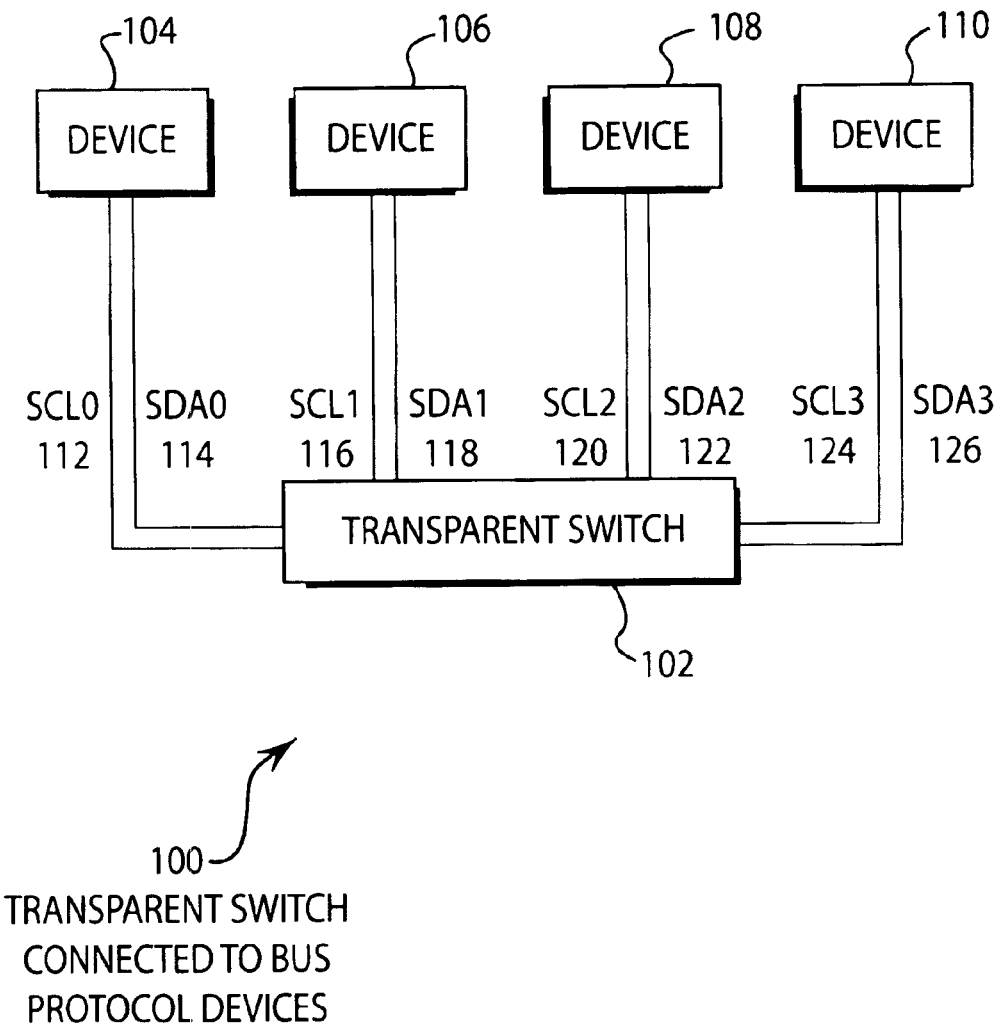
FIG. 1 is an illustration of an embodiment of the present invention showing a a transparent switch connected to bus protocol devices.

FIG. 1 illustrates an embodiment 100 of the present invention showing a transparent switch connected to bus protocol devices. Transparent switch 102 is connected to devices 104, 106, 108, and 110. Device 104 is connected to transparent switch 102 on lines SCL0 112 and SDA0 114. Device 106 is connected to transparent switch 102 on lines SCL1 116 and SDA1 118. Device 108 is connected to transparent switch 102 on lines SCL2 120 and SDA2 122. Device 110 is connected to transparent switch 102 on lines SCL3 124 and SDA3 126.

Each device 104, 106, 108, and 110 is capable of communicating on a multipoint bus topology using a bus protocol. A bus topology allows many devices to share a set of common communication lines. A transmitting device, called a master, may arbitrate to take control of the bus, send an address to one or more receiving devices, called slaves, and thereby establish a communications path between the master and the slave(s). Once the communications path is established, data may be communicated. When the communications have completed, an ending sequence allows all of the devices, both master and slave(s) to release connections with the bus and resume a wait state so that another communication may occur.

Each of the devices connected to the bus, whether master or slave, has the ability to monitor and change the state of the communication lines. Typically, a device that is acting as a master is capable of initializing communications. In some embodiments, several masters may be present on a bus. Some masters may be capable of operating as slaves, but not all slaves are capable of operating as masters.

A bus-type architecture allows only one communication to occur at a time. Thus, if many devices are connected to a bus, several devices may request to transmit on the bus simultaneously. When such a situation occurs, an arbitration sequence is typically used to negotiate between the various masters that are attempting to transmit. In the arbitration sequence, each master may simultaneously assert itself on the bus with other masters. Using a predetermined logic, one of the masters would be selected and the other masters would return to the wait state. The selected master would then control the bus until the end sequence is executed.

Every device connected to the bus may be capable of changing the state of one or more communications lines. If one device were to become faulty, it may cause one or more of the communications lines to become stuck in a high or low state and thereby prevent all communications on the bus to cease. When such a fault occurs in a bus-type architecture, the inability to communicate may cause the entire system of connected devices to fail. Further, it may be difficult if not impossible to determine which device has failed and for the entire system to continue functioning in a reduced functioning mode.

The transparent switch 102 connects to each device 104, 106, 108, and 110 directly on separate communications lines. Rather than having multiple devices connected to each other, the devices are separately and distinctly connected to the transparent switch 102. The transparent switch 102 is capable of communicating with each device separately and connecting the communications lines between the devices so that two or more devices may communicate to each other. The transparent switch 102 may be further capable of allowing two or more simultaneous communications to occur in parallel between two or more sets of communicating devices. In this manner, a network of devices may communicate much more efficiently and enable a much more data to be communicated over the network than with a bus-type architecture.

Each data line set 112 and 114, 116 and 118, 120 and 122, and 124 and 126 may be separately isolated from each other set. In this manner, a fault or failure of one device may not prevent any other communication from occurring. Further, the transparent switch 102 may isolate the various devices such that noise or other spurious signals on one data line is not transmitted to all of the devices on the bus.

In the figures, examples and throughout this specification, the communications lines are shown as SCL and SDA lines, which is a typical terminology for the Inter-Integrated Circuit ("I2C") protocol or the SMBus protocol. Those skilled in the arts will appreciate that other bus-type protocols, such as RS-485 and the like, may also be used with the transparent switch 102 while keeping within the spirit and intent of the present invention. References to a specific protocol are to illustrate various principles of the present invention and are not intended to be limiting in any manner.

Figure 2:
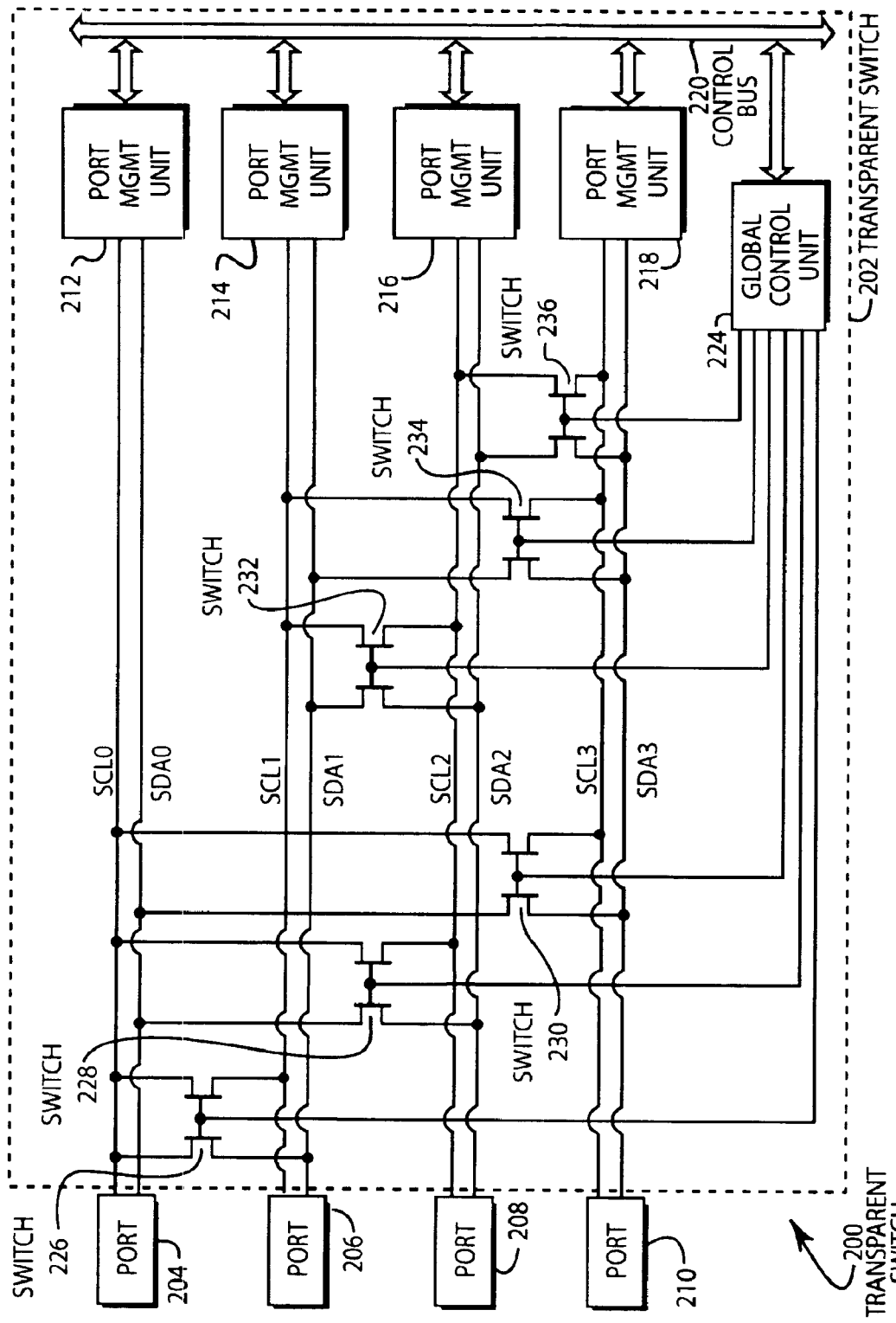
FIG. 2 is an illustration of an embodiment of the present invention showing a showing an architecture of a transparent switch.

FIG. 2 illustrates an embodiment 200 of the present invention showing an architecture of a transparent switch. The transparent switch 202 has four ports 204, 206, 208, and 210. Each switch has a corresponding port management unit 212, 214, 216, and 218. The port management units are connected to a control bus 220. A global control unit 224 is connected to the control bus 220 and switches 226, 228, 230, 232, 234, and 236.

The port management units 212, 214, 216, and 218 are capable of communicating to the devices connected to the transparent switch 202 using the specified protocol. A port management unit may be a state machine or other logic device that is capable of performing the necessary monitoring, handshaking, and toggling of the communications lines.

The global control unit 224 is connected to the various switches as well as the port management units and may be adapted to connect the communications lines of one port to the communications lines of two or more ports. In this manner, the transparent switch 202 may be capable of enabling communications to occur between two or more ports while the port management units may also monitor the ongoing status of the lines.

When a master device connected to one of the ports begins the arbitration sequence to request permission to communicate on the bus, the corresponding port management unit may execute the reciprocal sequence to allow the master device to establish communications and transmit the address or addresses of the intended slave device or devices. At this point, the communications between the port management unit and the master are suspended while the global control unit 224 causes the port management unit of each of the intended slave devices to establish communications with the slave devices using the arbitration and addressing sequences of the bus protocol. When all of the communications links are properly established between the port management units and the slaves, the global control unit 224 may set the state of the appropriate switches such that communications may occur directly between the master and slave(s). When the master has completed the transmission, the master may execute an ending sequence. The ending sequence may be detected by the port management units and the global control unit may open the appropriate switches to disconnect the communication lines between the various devices.

Each master and slave may communicate to the transparent switch 202 as if that master or slave were connected to a bus that was connected all of the devices. Devices that incorporate a standard bus protocol may be used with the transparent switch 202 to achieve all of the benefits of the transparent switch 202 while using an existing protocol.

The transparent switch 202 may be capable of supporting simultaneous communications on the network. For example, a first communication may be established between a master on port 204 and a slave on port 210. While the first communication is occurring, a second master on port 208 may establish communications with a slave on port 206. In this manner, the network is able to accommodate multiple transmissions simultaneously where in a bus-type topology would only be able to support one transmission.

Figure 3:
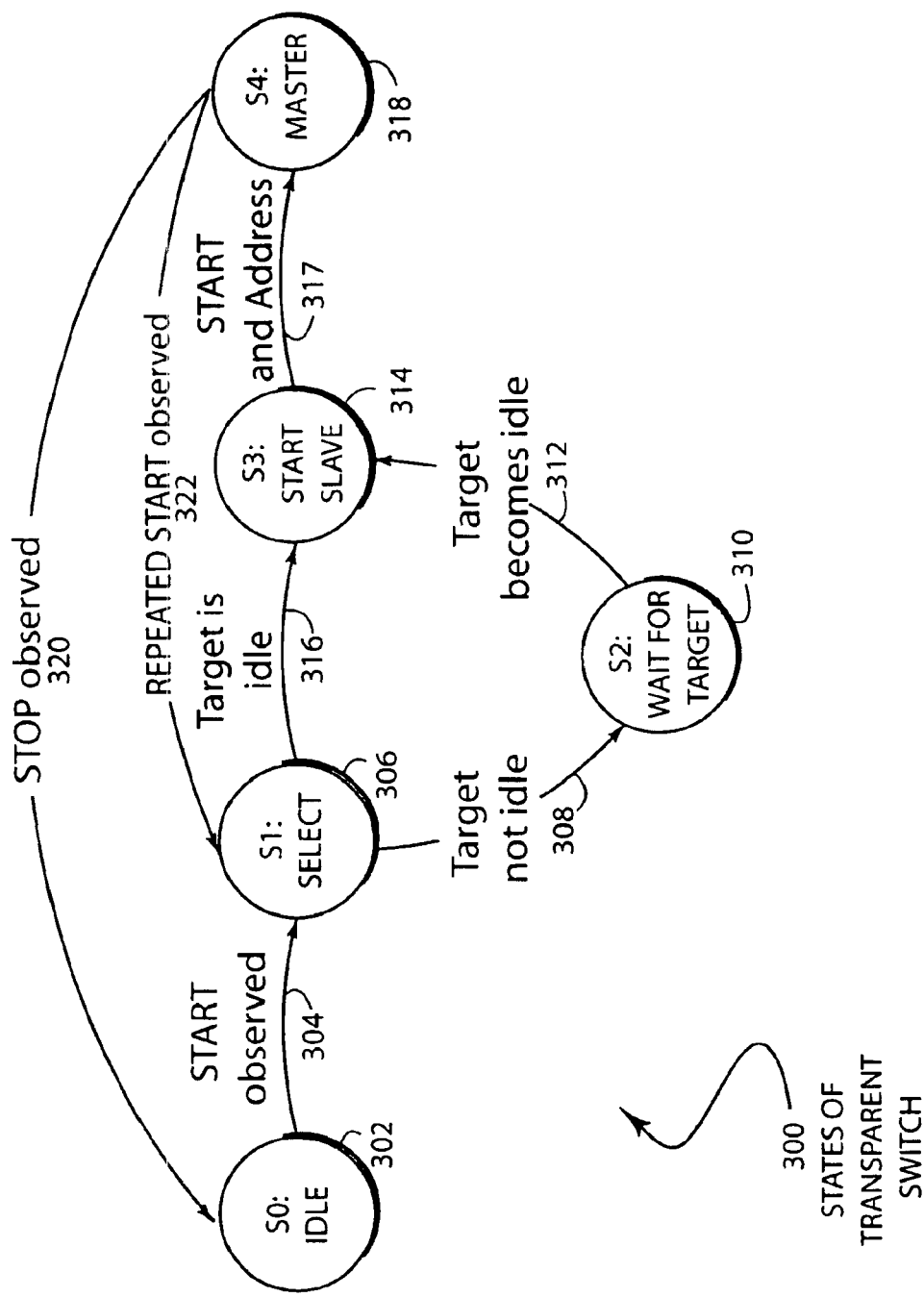
FIG. 3 is an illustration of an embodiment of the present invention showing a the various states of a port management unit of a transparent switch.

FIG. 3 illustrates an embodiment 300 of the present invention showing the various states of a port management unit of a transparent switch. The embodiment 300 is representative of an implementation of the present invention as applied to an I2C bus. The process begins with an idle state 302. When a master attached to the port issues a START command 304, a select state 306 is entered. In the select state 306, the port receives an address of the intended slave device or 'target.' If the target is not idle 308, the switch enters a wait state 310 until the target becomes idle 312 and the start slave state 314 is entered. If the target is idle 316, the start slave state 314 may be entered directly. In the start slave state 314, the transparent switch may send a START and address command 317 to the slave and enter the master state 318 where communications may occur between the master and slave. If a STOP command is observed 320 by the transparent switch, the connections between the devices is severed and the transparent switch enters the idle state 302. If a REPEATED START command is observed 322, the transparent switch enters the select state 306.

The embodiment 300 illustrates how communications may be built up and torn down between several devices. If a master requests to communicate with a particular slave that is currently busy communicating with another device, the wait for target state 310 holds the master in a temporary hold state while the transparent switch monitors the slave until the slave becomes idle again. When the slave is idle, communications are established between the requesting master and the slave.

Figure 4:
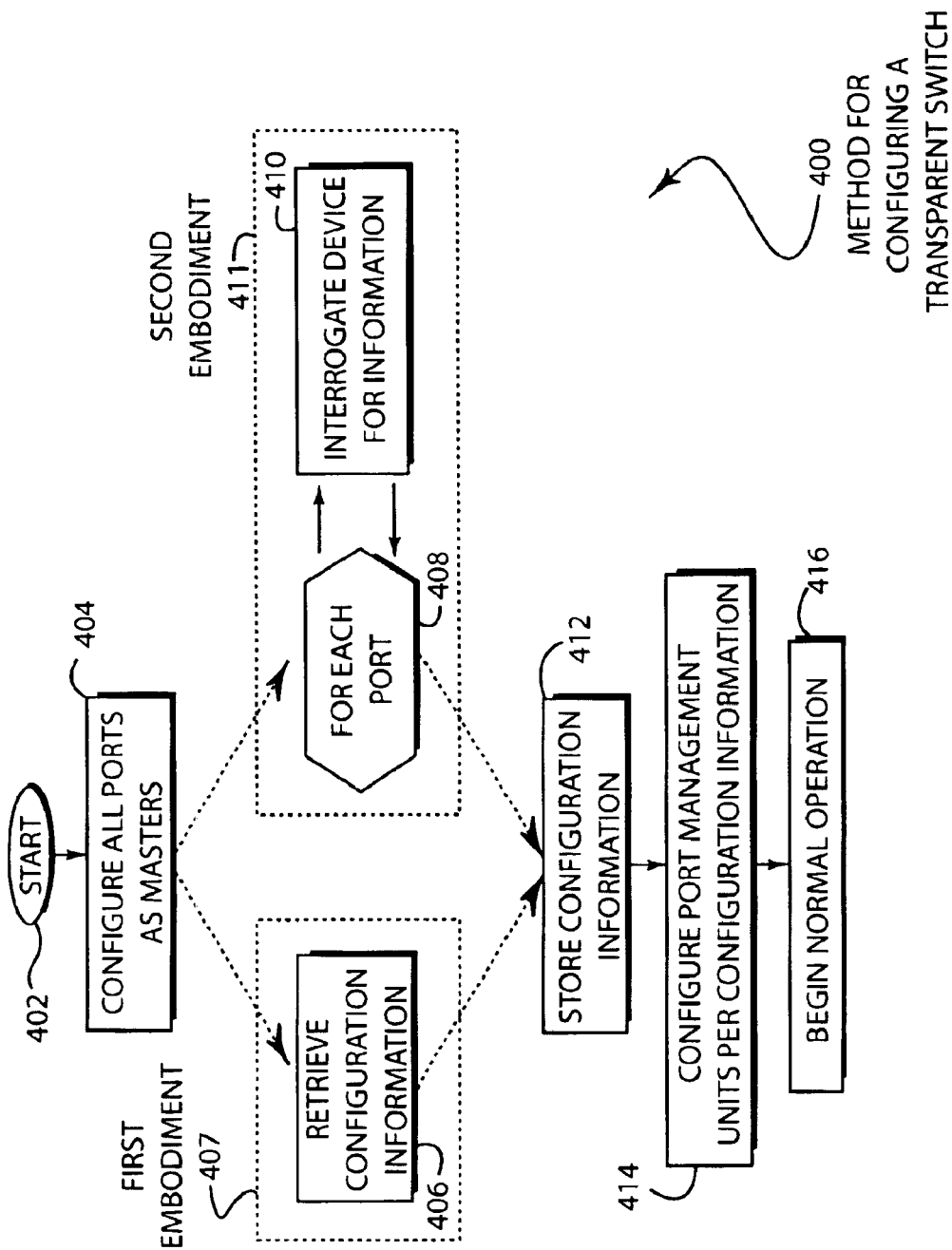
FIG. 4 is an illustration of an embodiment of the present invention showing a method for configuring a transparent switch.

FIG. 4 illustrates an embodiment 400 of the present invention showing a method for configuring a transparent switch. The process starts in block 402. On initialization, all of the ports may be configured as masters in block 404. In a first embodiment 407, the configuration information may be retrieved by the transparent switch in block 406. In a second embodiment 411, for each port in block 408, the device attached to the port may be interrogated for configuration information in block 410. The configuration information may be stored in block 412. The port management units and global control unit of the transparent switch may be configured using the configuration information in block 414 and normal operation may begin in block 416.

The configuration information may include which devices attached to the transparent switch are masters, slaves, or may operate as both. The transparent switch may be capable of operating with variations of protocol requirements such as being capable of communicating with one device having a certain transmission speed and handshaking requirements while another device connected to the transparent switch may have a separate and different transmission speeds and handshaking requirements. The port management unit attached to each device may be specifically configured to operate with the device using the configuration information.

In some embodiments, the addresses of each device on the network may not correspond with the connections to the ports on the transparent switch. In such an embodiment, the transparent switch may define an internal map, lookup table, or other memory device so that the addressing scheme used by the devices attached to the switch may be mapped to the appropriate port of the transparent switch.

The embodiment 400 illustrates how a transparent switch may retrieve information concerning the various devices attached to the transparent switch and use the configuration information to configure the transparent switch for normal operations. In the first embodiment 407, configuration information may be stored in a memory location or may be provided by communicating to a master device that is specifically adapted to transmit the configuration information.

In the second embodiment 411, each port may be interrogated to determine any information about the device attached thereto. For example, the device may be capable of returning its address, device type, and other parameters by a simple query. In another example, the port may be interrogated with different communication speeds and protocols to determine the highest operating speed and the appropriate protocol of the device. The information available by using the embodiment 411 may be limited by the devices attached to the ports.

The configuration information may be stored in block 412 and used to configure the port management units and global control unit in block 414. The various configuration settings such as communication speeds and protocols may be used by the port management units for adapting the performance and communications between each individual device. Any address mapping or device type information may be used by the global control unit for properly matching a master unit with the appropriate slave.

The configuration information used by the transparent switch may allow the switch to adapt itself to the optimum configuration for the devices attached thereto. For example, if the transparent switch determined that the maximum speed of a device is very high, the switch may communicate with that particular device at its highest speed. Further, as devices become more advanced and have improved capabilities with regard to the communications protocols, the transparent switch may be adapted to take advantage of those communications protocols while still being able to communicate with older devices that do not have the same capabilities.

In some embodiments, a transparent switch may not have any configuration parameters and may be hardwired to perform with a specific protocol and wherein the addressing scheme corresponds with the various ports. In such embodiments, programmable configuration of the transparent switch would be unnecessary.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of communicating from a first device to a second device wherein said devices are capable of communicating on a bus topology using a bus protocol comprising:

providing a transparent switch having at least a first port and a second port being capable of communicating using said bus protocol;

connecting said first device to said first port to establish a first connection;

connecting said second device to said second port to establish a second connection;

communicating a first initial sequence from said first device to said transparent switch, said first initial sequence comprising an address;

determining that said address is an address of said second device;

communicating a second initial sequence from said transparent switch to said second device, said second initial sequence comprising said address;

connecting said first port to said second port;

communicating between said first device to said second device over said first port connected to said second port; and disconnecting said first port from said second port.

2. The method of claim 1 wherein said bus protocol comprises:

an arbitration sequence;

an addressing sequence;

a data communication sequence; and an ending sequence.

3. The method of claim 2 wherein said first initial sequence comprises:

arbitrating control of said first connection using said arbitration sequence; and sending an address for said second device over said first connection using said addressing sequence.

4. The method of claim 2 wherein said second initial sequence comprises:

arbitrating control of said second connection using said arbitration sequence; and sending said address for said second device over said second using said addressing sequence.

5. The method of claim 1 wherein said bus topology comprises two communications lines.

6. The method of claim 5 wherein said bus protocol is a version of the Inter Integrated Circuit bus protocol.

7. The method of claim 5 wherein said bus protocol is a version of the RS-485 protocol.

8. The method of claim 5 wherein said bus protocol is a version of the SMBus protocol.

9. The method of claim 1 further comprising:

determining that said second device is in a busy state;

placing said first device in a hold state; and determining that said second device is in a wait state.

10. A transparent switch for communicating on a bus topology using a bus protocol comprising:

a first port connectable to a first device, said first port capable of communicating to said first device using said bus protocol;

a second port connectable to a second device, said second port adaptable of communicating to said second device using said bus protocol;

a controller adapted to receive a first initial sequence on said first port, transmit a second initial sequence on said second port, connect said first port to said second port, determine that an ending sequence has been received on said first port, transmitting said ending sequence on said second port, and disconnecting said first port from said second port.

11. The transparent switch of claim 10 wherein said bus protocol comprises:

an arbitration sequence;

an addressing sequence;

a data communication sequence; and an ending sequence.

12. The transparent switch of claim 11 wherein said first initial sequence comprises:

an arbitration sequence from said first device to said first port such that communications are established between said first device and said first port; and an address sequence containing an address for said second device.

13. The transparent switch of claim 12 wherein said second initial sequence comprises:

an arbitration sequence from said second port to said second device such that communications are established between said second port and said second device; and an address sequence containing an address for said second device.

14. The transparent switch of claim 10 wherein said bus topology comprises two communications lines.

15. The transparent switch of claim 14 wherein said bus protocol is a version of the Inter Intergrated Circuit bus protocol.

16. The transparent switch of claim 14 wherein said bus protocol is a version of the RS-485 protocol.

17. The transparent switch of claim 14 wherein said bus protocol is a version of the SMBus protocol.

* * * * *